US008289862B2

(12) United States Patent  
Xia et al.

(10) Patent No.: US 8,289,862 B2  
(45) Date of Patent: Oct. 16, 2012

(54) METHOD AND APPARATUS FOR DYNAMIC LMA ASSIGNMENT IN PROXY MOBILE IPV6 PROTOCOL

(75) Inventors: Yangsong Xia, Nanjing (CN); Behcet Sarikaya, Wylie, TX (US)

(73) Assignee: FutureWei Technologies, Inc., Plano, TX (US)

( * ) Notice: Subject to any disclaimer, the term of this patent is extended or adjusted under 35 U.S.C. 154(b) by 1102 days.

(21) Appl. No.: 12/143,005

(22) Filed: Jun. 20, 2008

(65) Prior Publication Data

US 2009/0003297 A1 Jan. 1, 2009

Related U.S. Application Data

(60) Provisional application No. 60/946,719, filed on Jun. 27, 2007.

(51) Int. Cl.
G08C 15/00 (2006.01)
H04L 12/26 (2006.01)
H04L 12/28 (2006.01)
H04L 12/56 (2006.01)

(52) U.S. Cl. ............ 370/252; 370/389; 370/395.54; 370/401

(58) Field of Classification Search .............. None
See application file for complete search history.

(56) References Cited

U.S. PATENT DOCUMENTS

| 6,751,672 | B1 | 6/2004 | Khalil et al. |
| 7,161,929 | B1 | 1/2007 | O'Neill et al. |
| 7,356,020 | B2 | 4/2008 | O'Neill |
| 7,382,748 | B1 | 6/2008 | Bharatia et al. |
| 2003/0067923 | A1* | 4/2003 | Ju et al. .............. 370/395.3 |
| 2003/0137974 | A1 | 7/2003 | Kwan et al. |
| 2003/0225900 | A1* | 12/2003 | Morishige et al. ......... 709/230 |
| 2004/0136348 | A1 | 7/2004 | Han |
| 2004/0218566 | A1 | 11/2004 | Han |

(Continued)

FOREIGN PATENT DOCUMENTS

CN 1484407 A 3/2004

(Continued)

OTHER PUBLICATIONS

K. Chowdhury, A. Lior and H. Tschofenig's "RADIUS Mobile IPv6 Support draft-ietf-mip6-radius-02.txt", Mar. 7, 2007,The IETF trust, pp. 19, 23, 45, 47.*

(Continued)

Primary Examiner — Chirag Shah  
Assistant Examiner — Ashley Shivers  
(74) Attorney, Agent, or Firm — Slater & Matsil, L.L.P.

(57) ABSTRACT

Methods and apparatuses are provided for supporting mobility in a Proxy Mobile Internet Protocol ("IP") network without having a mobile node ("MN") to participate in certain mobility related signaling. Instead, a proxy agent might implement functions of a mobile access gateway ("MAG") in a Proxy Mobile Internet Protocol Version 6 ("IPv6") network. The proxy agent, rather than the MN, might send a request to a Dynamic Host Configuration Protocol ("DHCP") server, and receive back a local mobility anchor address ("LMAA") of a local mobility anchor ("LMA"). The proxy agent might instead perform a Domain Name System ("DNS") lookup for the LMAA of the LMA first; in response to a failure to receive the LMAA, the proxy agent might then send the request to the DHCP server to receive the LMAA. The proxy agent might further update DNS information of the MN.

12 Claims, 4 Drawing Sheets

U.S. PATENT DOCUMENTS

| | | | |
|---|---|---|---|
| 2005/0169249 A1* | 8/2005 | Shirota et al. | 370/352 |
| 2005/0226180 A1* | 10/2005 | Devarapalli et al. | 370/328 |
| 2006/0130136 A1* | 6/2006 | Devarapalli et al. | 726/15 |
| 2006/0274693 A1 | 12/2006 | Nikander et al. | |
| 2007/0091850 A1 | 4/2007 | Lee et al. | |
| 2007/0133463 A1 | 6/2007 | Hori et al. | |
| 2007/0248083 A1 | 10/2007 | Kasapidis | |
| 2007/0268919 A1 | 11/2007 | Sarikaya et al. | |
| 2009/0010206 A1* | 1/2009 | Giaretta et al. | 370/328 |
| 2010/0097977 A1* | 4/2010 | Rommer et al. | 370/315 |
| 2010/0290621 A1* | 11/2010 | Muhanna et al. | 380/270 |

FOREIGN PATENT DOCUMENTS

| | | |
|---|---|---|
| CN | 1543256 A | 11/2004 |
| CN | 1705285 A | 12/2005 |
| CN | 1875579 A | 12/2006 |
| CN | 1879365 A | 12/2006 |
| EP | 1 679 834 A1 | 7/2006 |
| EP | 1 684 470 A1 | 7/2006 |
| KR | 10-0694302 B1 | 3/2007 |
| KR | 10-2007-0061296 A | 6/2007 |
| WO | WO 2005/053187 A1 | 6/2005 |
| WO | WO 2006/003497 A1 | 1/2006 |

OTHER PUBLICATIONS

K. K Chowdhury and A. Yegin's "MIP6-bootstrapping for the Integrated Scenario draft-ietf-mip6-bootstrapping-integrated-02.txt", Feb. 7, 2007 The IETF Trust, p. 19.*

Bradner, S., "Key Words for use in RFCs to Indicate Requirement Levels," Internet Engineering Task Force, Network Working Group, Request for Comments: 2119 (RFC 2119), Category: Best Current Practice, Mar. 1997, 3 pages.

Narten, T., et al., "Neighbor Discovery for IP Version 6 (IPv6)," Internet Engineering Task Force, Network Working Group, Request for Comments: 2461 (RFC 2461), Obsoletes: 1970, Category: Standards Track, Dec. 1998, 87 pages, The Internet Society.

Sun, et al., "Mobile IP Technique," ISBN 7-5053-8754-5, Version 1, Aug. 2003, 28 pages, Publishing House of Electronics Industry, Beijing.

Koodli, R., "Fast Handovers for Mobile IPv6," Internet Engineering Task Force, Network Working Group, Request for Comments: 4068 (RFC 4068), Category: Experimental, Jul. 2005, 40 pages, The Internet Society.

"Draft IEEE Standard for Local and Metropolitan Area Networks: Media Independent Handover Services," IEEE P802.21/D00.05, Jan. 2006, 169 pages, Institute of Electrical and Electronics Engineers, Inc., New York, New York.

Haddad, W., et al., "Authenticating FMIPv6 Handovers; draft-haddad-mipshop-fmipv6-auth-02," MIPSHOP Working Group, Internet-Draft, Sep. 21, 2006, 15 pages, The Internet Society.

Haddad, W., et al., "Secure Neighbor Discovery (SEND) Optimization and Adaptation for Mobility: The OptiSEND Protocol; draft-haddad-mipshop-optisend-02," Network Working Group, Internet-Draft, Oct. 23, 2006, 13 pages, The Internet Society.

Yokota, H., et al., "Mobile IPv6 Fast Handovers for 3G CDMA Networks; draft-ietf-mipshop-3gfh-01.txt," Internet Engineering Task Force, Network Working Group, Internet-Draft, Oct. 23, 2006, 40 pages, The Internet Society.

Jang, H., et al., "Mobile IPv6 Fast Handovers over IEEE 802.16e Networks; draft-mipshop-fh80216e-01.txt,"Internet Engineering Task Force, MIPSHOP Working Group, Internet-Draft, Intended Status: Informational, Jan. 2, 2007, 20 pages, The Internet Society.

Gundavelli, S., et al., "Proxy Mobile IPv6; draft-sgundave-mip6-proxymip6-01," Internet Engineering Task Force, NETLMM WG, Internet-Draft, Jan. 5, 2007, 39 pages, The Internet Society.

Madanapalli, S., "Analysis of IPv6 Link Models for 802.16e based Networks; draft-ietf-16ng-ipv6-link-model-analysis-02.txt," Internet Engineering Task Force, 16ng Working Group, Internet-Draft, Intended status: Informational, Jan. 11, 2007, 17 pages, The Internet Society.

Patil, B., et al., "IPv6 Over the Specific part of the Packet Convergence sublayer in 802.16 Networks; draft-ietf-16ng-ipv6-over-ipv6cs-07," Internet Engineering Task Force, Network Working Group, Internet-Draft, Intended status: Standards Track, Jan. 23, 2007, 20 pages, The IETF Trust (2007).

International Search Report and Written Opinion of the International Searching Authority, International Application No. PCT/CN2008/070319, Applicant: Huawei Technologies Co., Ltd., et al., Date of mailing: Jun. 5, 2008, 12 pages.

International Preliminary Report on Patentability, International Application No. PCT/CN2008/070319, Applicant: Huawei Technologies Co., Ltd., Date of issuance: Aug. 19, 2009, 5 pages.

Chinese Office Action, Chinese Application No. 200880000951.1, Date of Mailing: Mar. 30, 2010, 13 pages.

Supplementary European Search Report, European Application No. 08706692.4-2413, Applicant: Huawei Technologies Co., Ltd., Dated: Oct. 4, 2010, 7 pages.

Jang, H. et al., "DHCP Options for Home Information Discovery in MIPv6," The IETF Trust, 22 pages, May 22, 2008.

* cited by examiner

METHOD AND APPARATUS FOR DYNAMIC LMA ASSIGNMENT IN PROXY MOBILE IPV6 PROTOCOL

CROSS-REFERENCES TO RELATED APPLICATIONS

The present application claims benefit of U.S. provisional application No. 60/946,719, filed on Jun. 27, 2007, entitled "SYSTEM FOR FAST HANDOVERS, AUTHENTICATION, AND FIREWALL TRAVERSAL FOR MOBILE IPv6 NETWORKS," the content of which is incorporated herein by reference for all purposes.

BACKGROUND

This application relates generally to communication in mobile networks. More specifically, this application relates to methods and apparatuses for supporting mobility without having a mobile node to participate in certain mobility related signaling.

The ability to provide network access as a mobile device moves across networks or segments of a network is becoming more and more important. Emerging technologies including WiMAX promise to bring forth even greater needs in providing users with transparent and seamless access to Internet Protocol ("IP") networks including the Internet. The Mobile IP protocol is designed to meet some of these needs, and Mobile IPv6 is a version of Mobile IP.

The Mobile IPv6 protocol has been extended to support IP mobility without having a mobile device to participate in certain mobility related signaling. More specifically, the Proxy Mobile IPv6 protocol has been proposed for providing NETwork based, Localized Mobility Management ("NETLMM"). In a Proxy Mobile IPv6 network, proxy agents based in the network are responsible for managing IP mobility on behalf of the mobile device.

To support IP mobility more fully without having a mobile device to participate in certain mobility related signaling, there is a general need to improve the proxy agents and their capabilities.

BRIEF SUMMARY

Embodiments of the invention provide methods and apparatuses for supporting mobility without having a mobile node ("MN") to participate in certain mobility related signaling. In one set of embodiments, rather than having a MN to discover an address of the MN's home agent, the address of the MN's home agent is dynamically assigned. More specifically, a proxy agent is responsible to discover the address of the MN's home agent on behalf of the MN. In a Proxy Mobile Internet Protocol Version 6 ("IPv6") network, the MN's home agent might implement functions of a local mobility anchor ("LMA"), and the proxy agent might implement functions of a mobile access gateway ("MAG").

In some embodiments, the MAG might discover the address of the MN's LMA by sending a request to a Dynamic Host Configuration Protocol ("DHCP") server. In other embodiments, the MAG might discover the address of the MN's LMA by performing a Domain Name System ("DNS") lookup of Fully Qualified Domain Name ("FQDN") information of the LMA. In yet other embodiments, the MAG might send the request to the DHCP server in response to a failure to receive the address of the MN's LMA after performing the DNS lookup.

In another set of embodiments, after an address of the MN has been configured, rather than having the MN to update DNS information of the MN, the DNS information of the MN is updated by the MAG. In some embodiments, the address of the MN might be configured after the MAG has received prefix information for the MN from the MN's LMA; the address of the MN's LMA might have been discovered earlier by the MAG Accordingly, the MN no longer participates in certain mobility related signaling. Rather, the certain mobility related signaling is performed by the improved MAG based in the network. Consequently, fewer burdens are placed on the MN and communication needs of the MN are also lessened, both leading to improved network access for mobile devices.

In one embodiment, a method for managing communication in a mobile network might include sending a request for a local mobility anchor address ("LMAA") of a local mobility anchor ("LMA") from a mobile access gateway ("MAG") in a Proxy Mobile Internet Protocol Version 6 ("IPv6") network to a Dynamic Host Configuration Protocol ("DHCP") server. The method might also include receiving the LMAA of the LMA from the DHCP server.

In another embodiment, a method for managing communication in a mobile network might include receiving Fully Qualified Domain Name ("FQDN") information of a local mobility anchor ("LMA") from an Authentication, Authorization and Accounting ("AAA") server at a mobile access gateway ("MAG") in a Proxy Mobile Internet Protocol Version 6 ("IPv6") network. The method might also include performing a Domain Name System ("DNS") lookup of the FQDN information of the LMA for a local mobility anchor address ("LMAA") of the LMA.

In yet another embodiment, a method for managing communication in a mobile network might include sending a Domain Name System ("DNS") update request message from a mobile access gateway ("MAG") in a Proxy Mobile Internet Protocol Version 6 ("IPv6") network to an Authentication, Authorization and Accounting ("AAA") server, wherein the DNS update request message includes Fully Qualified Domain Name ("FQDN") information of the MN. The method might also include receiving a reply message from the AAA server, wherein the reply message includes a result of updating the FQDN information of the MN.

The methods of the invention may be embodied in an apparatus comprising circuitry for operating the apparatus in accordance with the embodiments described above. The methods of the invention may also be embodied in an apparatus comprising a communication interface, a storage medium, a controller, and a set of instructions executable by the controller for operating the apparatus in accordance with the embodiments described above. Moreover, the methods of the invention may be embodied in a computer-readable storage medium having a computer-readable program embodied therein for directing operations of an apparatus including a controller. The computer-readable program includes instructions for operating the apparatus in accordance with the embodiments described above.

BRIEF DESCRIPTION OF THE DRAWINGS

A further understanding of the nature and advantages of particular embodiments may be realized by reference to the following drawings. In the drawings, like reference labels are used throughout the several drawings to refer to similar components. In some instances, a sublabel is associated with a reference numeral followed by a hyphen to denote one of multiple similar components. When reference is made to a reference numeral without specification to an existing sublabel, it is intended to refer to all such multiple similar components.

DETAILED DESCRIPTION

Embodiments of the invention provide methods and apparatuses for supporting mobility without having a mobile node ("MN") to participate in certain mobility related signaling. Merely by way of example, in one embodiment, a proxy agent might implement functions of a mobile access gateway ("MAG") in a Proxy Mobile Internet Protocol Version 6 ("IPv6") network. The MAG, rather than the MN, might send a request to a Dynamic Host Configuration Protocol ("DHCP") server, and receive back a local mobility anchor address ("LMAA") of a local mobility anchor ("LMA"). The LMA might serve as the MN's home agent in the Proxy Mobile IPv6 network, and the address of the MN's LMA is thus dynamically assigned.

Figure 1A:
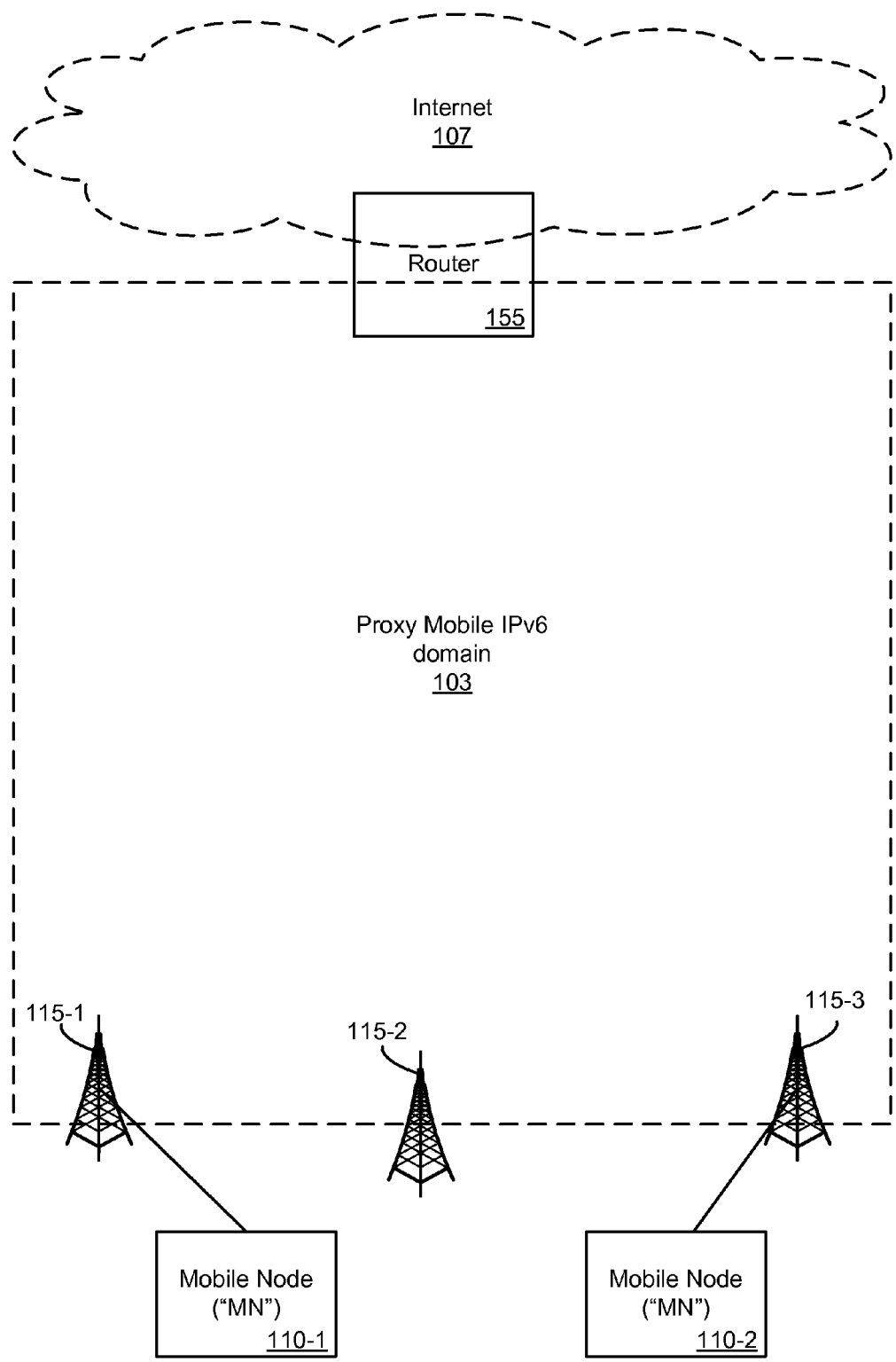
FIG. 1A provides a high level diagram illustrating a Proxy Mobile IPv6 network in an embodiment of the invention.

FIG. 1A provides a high level diagram illustrating a Proxy Mobile IPv6 network in an embodiment of the invention. A mobile node ("MN") 110 connects to a Proxy Mobile IPv6 domain 103 through an access point 115. The Proxy Mobile IPv6 domain 103 might interconnect with the Internet 107 through a router 155.

The MN 110 might comprise an Internet Protocol ("IP") host or router whose mobility is managed by the network. For example, the MN 110 might comprise a laptop computer and/or a transceiver and antenna. The MN 110 might operate in IPv4-only mode, IPv6-only mode, or dual IPv4/IPv6 mode. The MN 110 does not have to participate in certain mobility related signaling. Rather, the certain mobility related signaling might be provided by elements of the Proxy Mobile IPv6 domain 103. The MN 110 gains access to the Internet 107 after the MN 110 enters the Proxy Mobile IPv6 domain 103 by attaching to an access link through the access point 115.

The access point 115 might comprise a device that allows the mobile node 110 to enter the Proxy Mobile IPv6 domain 103. For example, the access point 115 might comprise a WiMAX tower. An access link through the access point 115 might be established between the mobile node 110 and one or more elements of the Proxy Mobile IPv6 domain 103 as will be explained in greater detail.

The Proxy Mobile IPv6 domain 103 might comprise a network or a portion of a network in which mobility is managed by using the Proxy Mobile IPv6 protocol. The router 155 might comprise any network routing element that connects networks or segments a network. The Internet 107 might comprise another IP based network or another segment of an IP based network.

Figure 1B:
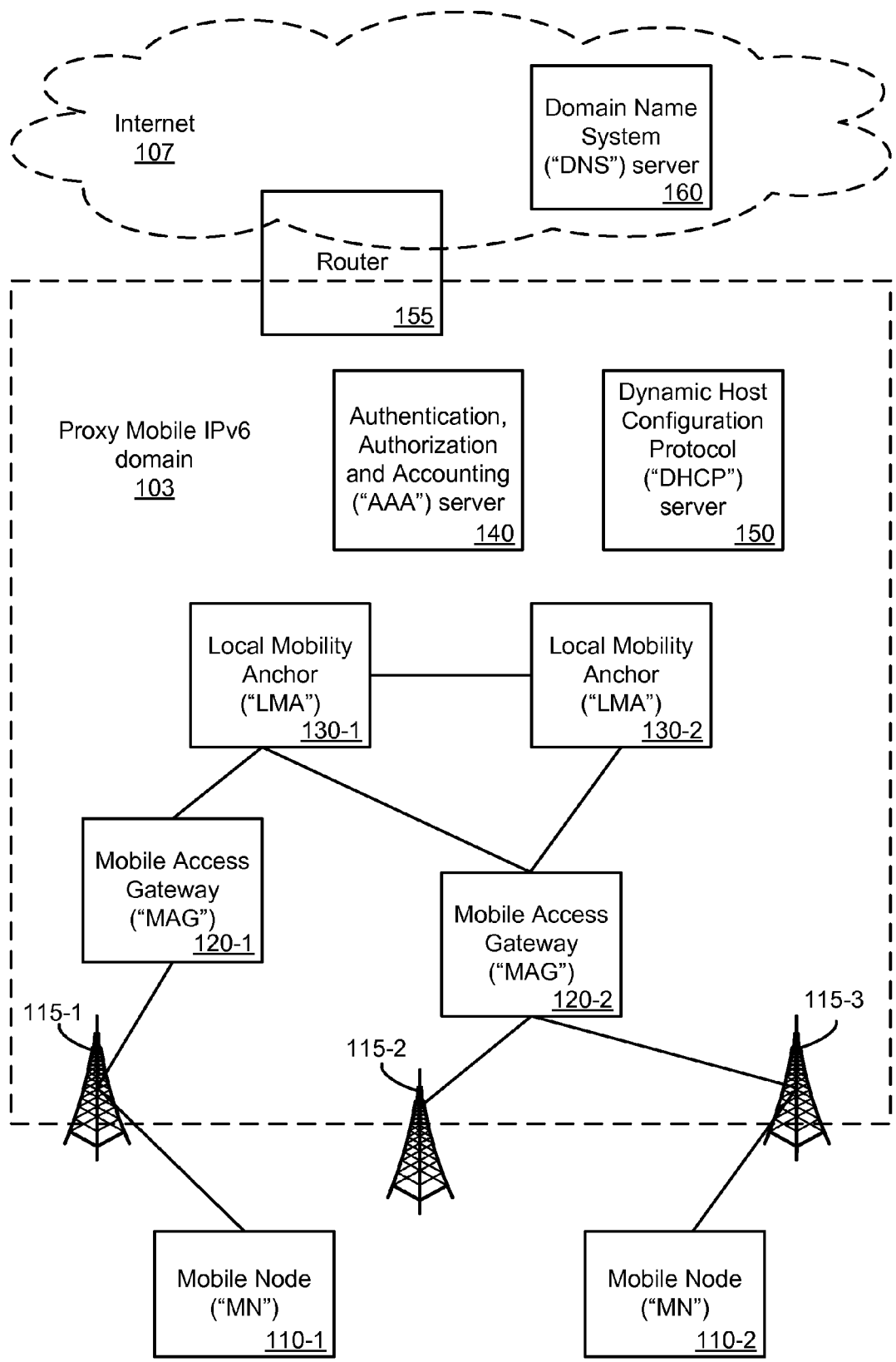
FIG. 1B provides a schematic diagram illustrating a Proxy Mobile IPv6 network in an embodiment of the invention.

FIG. 1B provides a schematic diagram illustrating a Proxy Mobile IPv6 network in an embodiment of the invention. The Proxy Mobile IPv6 domain 103 comprises at least a mobile access gateway ("MAG") 120 and at least a local mobility anchor ("LMA") 130. The Proxy Mobile IPv6 domain 103 might also comprise an Authentication, Authorization and Accounting ("AAA") server 140 and a Dynamic Host Configuration Protocol ("DHCP") server 150 in an embodiment. In another embodiment, the AAA server 140 and the DHCP server 150 might be considered as residing in the Internet 107. The Internet 107 might comprise a Domain Name System ("DNS") server 160 in an embodiment. In another embodiment, the DNS server 160 might be considered as residing in the Proxy Mobile IPv6 domain 103.

The MAG 120 might serve as a proxy agent in the Proxy Mobile IPv6 domain 103. The MAG 120 manages mobility related signaling for a MN 110 that is attached to an access link of the MAG 120. For example, the MAG 120 might be responsible for tracking movements of the MN 110 and for signaling with the LMA 130. The MAG 120 might be included in a network apparatus. For example, an access router might include instructions and/or circuitry to implement functions of the MAG 120.

The LMA 130 might serve as a home agent for the MN 110 in the Proxy Mobile IPv6 domain 103. For example, the LMA 130 might serve as an anchor point for home network prefix (es) the MN 110, and the LMA 130 might also manage the MN's binding state. As shown, a second MN 110-2 might attach to an access link of a second MAG 120-2, and a second LMA 130-2 might serve as a home agent of the second MN 110-2 in the Proxy Mobile IPv6 domain 103.

The AAA server 140 might comprise a server that implements concepts including one or more of authentication, authorization, and accounting. For example, the AAA server 140 might comprise a Remote Authentication Dial In User Service ("RADIUS") server that implements the RADIUS protocol. Among others, the AAA server 140 might also comprise a Diameter server that implements the Diameter protocol.

The DHCP server 150 might comprise a server that implements the DHCP protocol. In some embodiments, the DHCP server 150 might comprise a DHCPv6 server that supports DHCP over IPv6. The DNS server 160 might comprise a domain server or a subdomain server that implements the DNS protocol.

Figure 2:
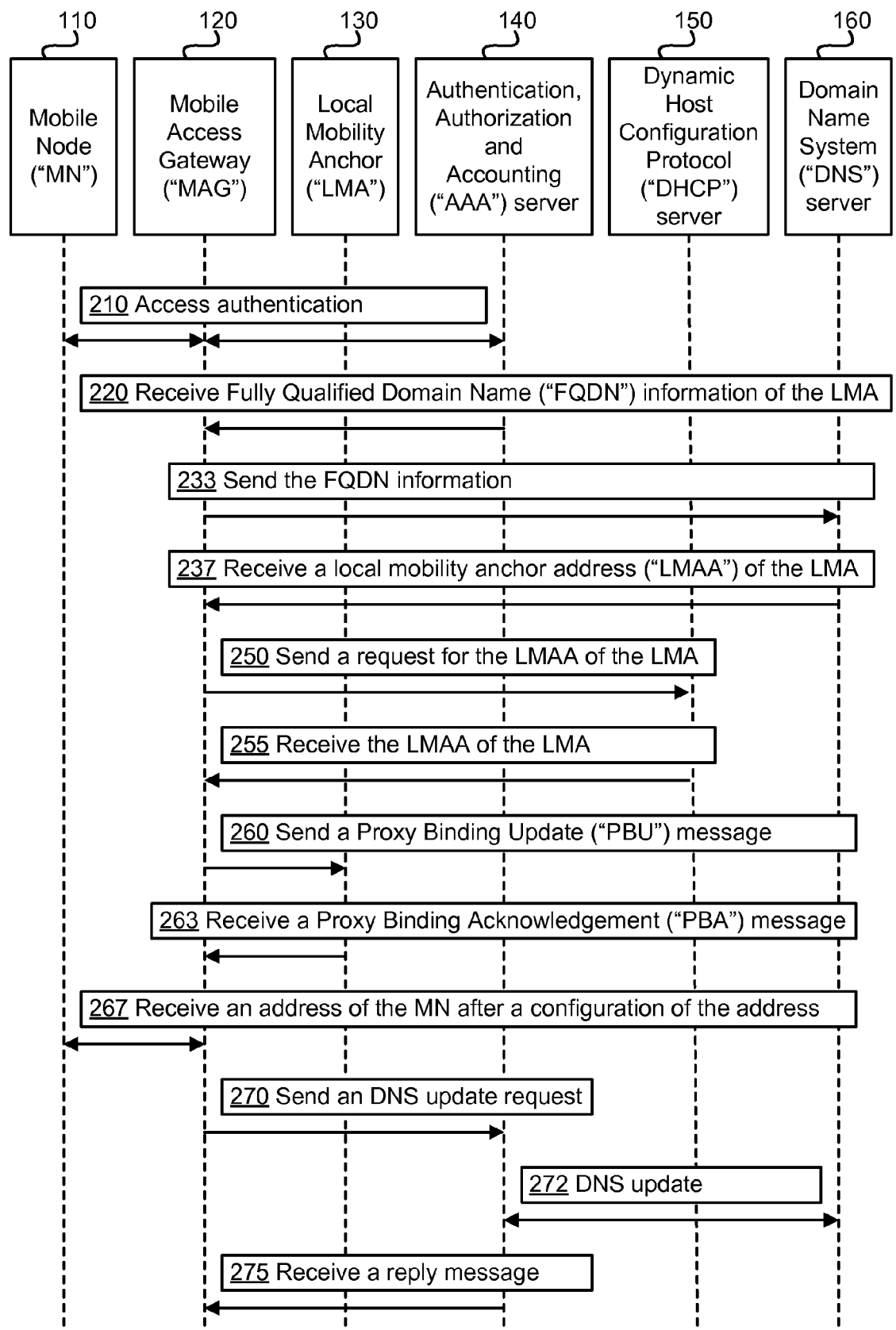
FIG. 2 is a flow diagram illustrating methods for supporting mobility without having a mobile node to participate in certain mobility related signaling in an embodiment of the invention.

FIG. 2 is a flow diagram illustrating methods for supporting mobility without having a mobile node to participate in certain mobility related signaling in an embodiment of the invention. At step 210, the MAG might receive an authentication message from the MN. More specifically, the MN might initiate authentication with the MAG when the MN accesses the Proxy Mobile IPv6 domain. The MAG might in turn authenticate the MN with the AAA server. In some embodiments, in a successful RADIUS Access-Accept message, a Service-Type attribute is included, and a value of the Service-Type attribute is set to Framed. In some embodiments, the MAG might also receive the MN's home network information from the AAA server during authentication. In some embodiments, the AAA server might comprise a RADIUS server.

Following successful authentication, the MN's LMA might then be dynamically assigned. More specifically, the MAG might receive from the AAA server in a RADIUS Access-Accept message a local mobility anchor address ("LMAA") of the LMA, and/or Fully Qualified Domain Name ("FQDN") information of the LMA. The MAG might also receive from the DHCP server the LMAA of the LMA.

In some embodiments, the MAG might simply use the LMAA of the LMA received in the RADIUS Access-Accept message. Alternatively and/or if the LMAA of the LMA is not received, the MAG might receive the FQDN information of the LMA in the RADIUS Access-Accept message from the AAA server at step 220 in other embodiments. The MAG might then perform a DNS lookup of the FQDN information of the LMA for the LMAA of the LMA. Performing the DNS lookup might include sending the FQDN information from the MAG to the DNS server at step 233, and receiving the LMAA of the LMA back from the DNS server at step 237.

Alternatively and/or in response to a failure to receive the LMAA back from the DNS server by performing the above DNS lookup of the FQDN information, the MAG might send a request for the LMAA of the LMA to the DHCP server at step 250 in yet other embodiments. For example, the MAG might send a DHCP Information-Request message to the DHCP server for the LMAA of the LMA. The DHCP Information-Request message might include the MN's home network information. As noted above, the MN's home network information might have been received by the MAG from the AAA server during authentication.

The DHCP server might use the MN's home network information to search for the MN's LMA and accordingly the LMAA of the LMA. The MAG might then receive a message from the DHCP server and the message might include the LMAA of the LMA at step 255. For example, the MAG might receive a DHCP Reply message that includes the LMAA of the LMA. In some embodiments, the DHCP server might comprise a DHCPv6 server.

In some embodiments, the MAG might not be in direct communication with the DHCP server. In one embodiment, the MAG might in fact communicate more directly with a DHCP replay agent rather than with the DHCP server. The DHCP relay agent might relay information between the MAG and the DHCP server. In another embodiment, the MAG might perform a DHCP relay function by also acting as the DHCP relay agent itself.

In some embodiments, in order to more easily reach the MN at the MN's dynamically assigned/generated IP address, DNS information of the MN might need to be updated. For example, another user or another MN might only know the MN's FQDN, and need to perform a FQDN lookup in order to find the MN's current IP address. To better ensure security, it might be desirable for a node sending a DNS update request to share a security association with the DNS server. However, the MAG might not share a security association with the DNS server, and the node sending the DNS update request might be the AAA server in some embodiments. Accordingly, the MAG might send the MN's FQDN information and the MN's IP address to the AAA server, and the AAA server might in turn communication with the DNS server to update the MN's DNS information.

More specifically, the MAG might first send a Proxy Binding Update ("PBU") message to the MN's LMA at step 260. The PBU message might include a Home Network Prefix ("HNP") option in a Proxy Mobile IPv6 registration message. As noted above, the MN's home network information might have been received by the MAG from the AAA server during authentication. In some embodiments, if the MAG specifies "0::/0" in the Proxy Mobile IPv6 registration message, the LMA will allocate a prefix for the MN.

At step 263, the MAG might receive a Proxy Binding Acknowledgement ("PBA") message from the LMA. The PBA message might include prefix information that has been confirmed by the LMA for the MN. At step 267, the MAG might receive an address of the MN after a configuration of the address. More specifically, the MAG might advertise the prefix information through an Internet Control Message Protocol ("ICMP") Router Advertisement message for stateless address auto-configuration. Subsequently, the MN might generate its own interface ID, and formulate an IP address using the interface ID and the advertised prefix information. The MN might then send an ICMP Neighbor Solicitation message for the MAG to receive the MN's IP address.

After the MAG has receive the MN's IP address, the MAG might send a DNS update request message to the AAA server at step 270. The DNS update request message might include the MN's FQDN information and the MN's IP address. In some embodiments, the DNS update request message might comprise a RADIUS Access-Request message; in the message, the MIP6-DNS-MO attribute might be used for including the MN's FQDN information.

At step 272, the AAA server might communication with the DNS server to update the MN's DNS information. At step 275, the MAG might receive a reply message from the AAA server, and the reply message might include a result of updating the FQDN information of the MN. In some embodiments, the MAG might receive a RADIUS Access-Accept message; in the message, the MIP6-DNS-MO attribute might be used to provide a result of updating the FQDN information of the MN in the Status field.

Figure 3:
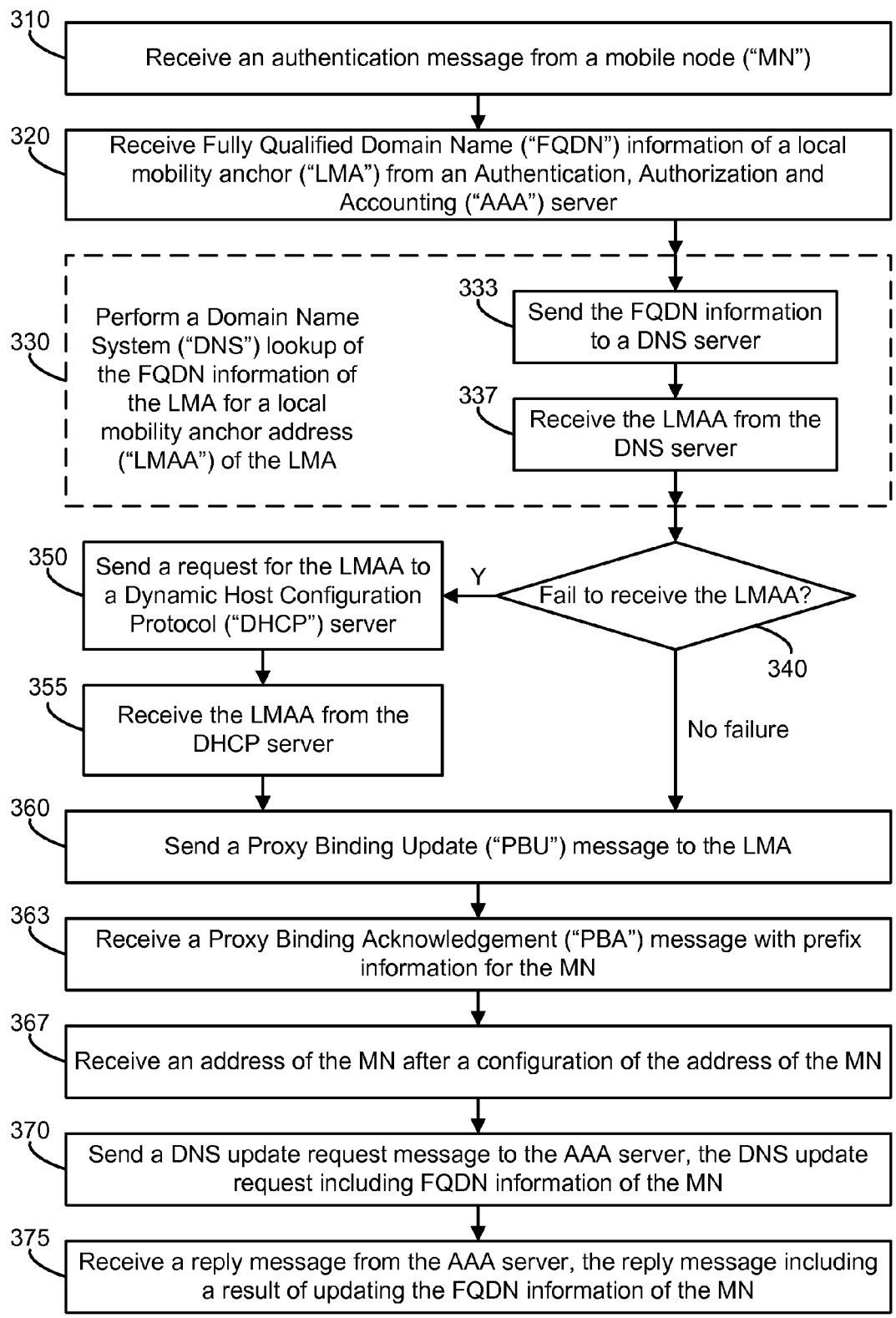
FIG. 3 is a flow diagram summarizing methods for supporting mobility without having a mobile node to participate in certain mobility related signaling in an embodiment of the invention.

FIG. 3 is a flow diagram summarizing methods for supporting mobility without having a mobile node to participate in certain mobility related signaling in an embodiment of the invention. At block 310, the MAG might receive an authentication message from the MN. Following successful authentication, the MN's LMA might then be dynamically assigned. At block 320, the MAG might receive FQDN information of the MN's LMA from the AAA server. In some embodiments, the AAA server might comprise a RADIUS server. At block 330, the MAG might then perform a DNS lookup of the FQDN information of the LMA for the LMAA of the LMA. Performing the DNS lookup might include sending the FQDN information from the MAG to the DNS server at block 333, and receiving the LMAA of the LMA back from the DNS server at block 337.

At block 340, the MAG might determine if the MAG has failed to receive the LMAA of the LMA after performing the above DNS lookup of the FQDN information of the LMA in some embodiments. If so, the MAG might respond by sending a request for the LMAA of the LMA to the DHCP server at block 350. In other embodiments, the MAG might send a request for the LMAA of the LMA to the DHCP server at block 350 before and/or instead of receiving FQDN information and/or LMAA of the LMA from the AAA server. The request might include the MN's home network information. The MN's home network information might have been received by the MAG from the AAA server during authentication. The DHCP server might use the MN's home network information to search for the MN's LMA and accordingly the LMAA of the LMA. The MAG might then receive a message from the DHCP server and the message might include the LMAA of the LMA at block 355. In some embodiments, the DHCP server might comprise a DHCPv6 server. In other embodiments, the MAG might perform a DHCP relay function when the MAG and the DHCP server are connected through an intermediate network element and/or are not connected directly.

At block 360, the MAG might send a Proxy Binding Update ("PBU") message to the MN's LMA in some embodiments. At block 363, the MAG might receive a Proxy Binding Acknowledgement ("PBA") message from the LMA. The PBA message might include prefix information that has been confirmed for the MN. At block 367, the MAG might receive an address of the MN after a configuration of the address.

After the MAG has received the MN's address, the MAG might send a DNS update request message to the AAA server at block 370 in some embodiments. The DNS update request message might include the MN's FQDN information. In some embodiments, the DNS update request message might comprise a RADIUS Access-Request message; in the message, the MIP6-DNS-MO attribute might be used for including the MN's FQDN. At block 375, the MAG might receive a reply message from the AAA server, and the reply message might include a result of updating the FQDN information of the MN.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for managing communication in a mobile network, the method comprising:
   receiving Fully Qualified Domain Name ("FQDN") information of a local mobility anchor ("LMA") from an Authentication, Authorization and Accounting ("AAA") server at a mobile access gateway ("MAG") in a Proxy Mobile Internet Protocol Version 6 ("IPv6") network;
   performing, by the MAG, a Domain Name System ("DNS") lookup of the FQDN information of the LMA for a local mobility anchor address ("LMAA") of the LMA; sending a DNS update request message from the MAG to the AAA server, wherein the DNS update request message includes a second FQDN information of a mobile node ("MN"); and
   receiving a reply message from the AAA server, wherein the reply message includes a result of updating the second FQDN information of the MN.

2. The method of claim 1, wherein the AAA server comprises a Remote Authentication Dial In User Service ("RADIUS") server.

3. The method of claim 1, further comprising receiving an authentication message from the MN.

4. The method of claim 1, wherein the FQDN information of the LMA is included in a message after a successful authentication.

5. The method of claim 1, further comprising receiving a Remote Authentication Dial In User Service ("RADIUS") Access-Accept message, wherein the message comprises a Service-Type attribute and a value of the Service-Type attribute is set to Framed.

6. The method of claim 1, wherein performing the DNS lookup comprises:
   sending, by the MAG, the FQDN information to a DNS server; and
   receiving, by the MAG, the LMAA from the DNS server.

7. A method for managing communication in a mobile network, the method comprising:
   performing a Domain Name System ("DNS") lookup of first Fully Qualified Domain Name ("FQDN") information of a local mobility anchor ("LMA") for a local mobility anchor address ("LMAA") of the LMA;
   sending a DNS update request message from a mobile access gateway ("MAG") in a Proxy Mobile Internet Protocol Version 6 ("IPv6") network to an Authentication, Authorization and Accounting ("AAA") server, wherein the DNS update request message includes second FQDN information of a mobile node ("MN"); and
   receiving a reply message from the AAA server, wherein the reply message includes a result of updating the second FQDN information of the MN.

8. The method of claim 7, wherein the DNS update request comprises a Remote Authentication Dial In User Service ("RADIUS") Access-Request message, and the second FQDN information is included in a MIP6-DNS-MO attribute.

9. The method of claim 7, further comprising
   sending a Proxy Binding Update ("PBU") message to the LMA;
   receiving a Proxy Binding Acknowledgement ("PBA") message with prefix information for the MN; and
   receiving an address of the MN after a configuration of the address of the MN.

10. The method of claim 9, further comprising receiving the LMAA of the LMA from a Dynamic Host Configuration Protocol ("DHCP") server.

11. A network apparatus for managing communication in a mobile network and implementing functions of a mobile access gateway ("MAG") in a Proxy Mobile Internet Protocol Version 6 ("IPv6") network, the network apparatus comprising:
    circuitry configured to receive Fully Qualified Domain Name ("FQDN") information of a local mobility anchor ("LMA") from an Authentication, Authorization and Accounting ("AAA") server;
    circuitry configured to perform, by the MAG, a Domain Name System ("DNS") lookup of the FQDN information of the LMA for a local mobility anchor address ("LMAA") of the LMA;
    circuitry configured to send a DNS update request message from the MAG to the AAA server, wherein the DNS update request message includes a second FQDN information of a mobile node MN; and
    circuitry configured to receive a reply message from the AAA server, wherein the reply message includes a result of updating the second FQDN information of the MN.

12. A network apparatus for managing communication in a mobile network and implementing functions of a mobile access gateway ("MAG") in a Proxy Mobile Internet Protocol Version 6 ("IPv6") network, the network apparatus comprising:
    circuitry configured to perform a Domain Name System ("DNS") lookup of first Fully Qualified Domain Name ("FQDN") information of a local mobility anchor ("LMA") for a local mobility anchor address ("LMAA") of the LMA;
    circuitry configured to send a DNS update request message to an Authentication, Authorization and Accounting ("AAA") server, wherein the DNS update request message includes second FQDN information of a mobile node ("MN"); and
    circuitry configured to receive a reply message from the AAA server, wherein the reply message includes a result of updating the FQDN information of the MN.

* * * * *